United States Patent Office 2,765,237
Patented Oct. 2, 1956

2,765,237

COATING COMPOSITIONS

Folsom E. Drummond, Washington, D. C., assignor to Midland Chemical Corporation, Dayton, Ohio, a corporation of Delaware No Drawing. Application February 27, 1953,
Serial No. 339,474

1 Claim. (Cl. 106—84)

This invention relates to improvements in coating compositions and more particularly to coating compositions which are adapted to be applied to metal surfaces and form a film thereover containing principally zirconium metal for protecting the surface against corrosion.

The coating compositions of this invention comprise essentially finely divided particles of metallic zirconium or zirconium alloys that are suspended in a vehicle and which are adapted to be applied to metal surfaces by spraying, dipping, brushing, roll coating or the like, and thereafter air dried or baked at suitable temperatures to produce a hard, tenacious coating film thereover which is resistant to abrasion and corrosion.

It has been known heretofore to prepare coating compositions utilizing pigments with a binder such as alkali metal silicates and the like, the coating compositions being applied to metal surfaces and then baked to produce a protective coating film thereon. While such coating compositions, particularly those containing finely divided metal oxides provide useful protective coatings for metal surfaces, they have the disadvantage that due to the tendency of the materials to react the concentration of the alkali metal silicate must be carefully controlled since the use of highly concentrated alkali metal silicate solutions causes a reaction to take place with evolution of gases. This results in the formation of blisters in the coating film which is, of course, undesirable. It is an object of this invention to overcome these drawbacks and to provide an abrasion-resistant coating having improved resistance to corrosion.

Another object of the invention is to provide a coating composition of the alkali metal silicate-powdered metal type in which zirconium metal is the principal constituent, the coating composition being applied to metal or other surfaces and baked to form a tenacious, corrosion resistant film thereon.

It is a further object of this invention to provide a liquid coating composition and method for coating metal and the like surfaces whereby a protective film of zirconium metal particles is caused to firmly adhere to the surface forming a coating thereover which is resistant to abrasion and atmospheric conditions conducive to corrosion.

These and other objects and advantages of the invention will become apparent from the following description and wherein typical examples of the composition and method of application are set forth.

The coating compositions compounded in accordance with this invention comprise a mixture of zirconium metal dust and aqueous alkali metal silicates, sodium silicate or waterglass being generally used as the alkali metal silicate. Other alkali metal silicates, such as potassium or lithium silicate may be employed, however, if desired. The proportion of sodium oxide ($Na_2O$) to silica ($SiO_2$) of the sodium silicate used preferably lies between about 1 and 6, but the particular proportion of oxides will depend on the method of application of the coating and material being treated.

When alkali metal silicate solutions are employed which have a specific gravity lower than about 1.26, the coating compositions are of relatively low viscosity as compared with higher specific gravity silicate solutions. The lower viscosity vehicle likewise produces a thinner coating or film when the composition is applied and dried.

Typical coating compositions illustrative of this invention are as follows:

Example I

| | Parts by weight |
|---|---|
| Sodium silicate (mole ratio $Na_2O$ to $SiO_2$ of 1:3 to 1:6) | 20 to 40 |
| Zirconium metal powder (crushed sponge) | 60 to 120 |

Example II

| | Parts by weight |
|---|---|
| Sodium silicate (mole ratio $Na_2O:SiO_2$ 1:3 to 1:4) | 20 to 30 |
| Zirconium metal powder (bulk passing 200 mesh) | 60 to 100 |
| Lead chromate | 5 to 10 |

Example III

| | Parts by weight |
|---|---|
| Sodium silicate (mole ratio $Na_2O:SiO_2$ 1:4 to 1:6) | 20 to 50 |
| Zirconium alloy metal powder (1 to 3% aluminum, 1 to 5% chromium, 1 to 2% hafnium, the remainder substantially all zirconium) | 60 to 130 |

The above coating compositions may be applied to metal surfaces by spraying, brushing or flow coating, as by dipping the metal articles in a tank containing the liquid coating composition, and thereafter baking the coating from 1½ to 3 hours at a temperature between about 200° and 300° F. Preferably, the baking of the coating composition is carried out in a moisture-free atmosphere.

The zirconium metal particles preferably are of relatively small size, and uniformly distributed throughout the coating film.

To vary the color of the above compositions, a portion of the zirconium metal or zirconium metal alloy may be substituted by a color pigment, such as the oxides and carbonates of lead, zinc, titanium and the like. Organic dyes also may be incorporated for a part of the zirconium metal. An example illustrative of such a modified composition is as follows:

Example IV

| | Parts by weight |
|---|---|
| Titanium oxide | 5 to 25 |
| Zirconium metal powder (crushed sponge metal) | 10 to 120 |
| Sodium silicate having a ratio of $Na_2O:SiO_2$ of from 1:2 to 1:4 defined in moles | 10 to 60 |

The compositions of the invention may be made up by suitably mixing the zirconium metal powder and pigments, if any, with the alkali metal silicate vehicle using a pony mixer or the like. A burr mill or roller mill, such as utilized in the paint industry, however, may be used, if desired, to incorporate the zirconium metal powder with the liquid silicate vehicle. Where additions of pigments such as carbon or lamp blacks and the like are desired, the pigment is ground in a portion of the liquid silicate vehicle forming a paste. A ball mill may also be used to disperse the metal and pigment particles in the vehicle and form a paste. The paste thus formed is then incorporated with the remaining ingredients to produce a finished product.

The zirconium metal powder preferably comprises particles of which approximately 80% passes a 200 inch, or finer, mesh sieve, the remainder passing at least 150 inch screen. The zirconium metal may be obtained from any suitable source and may be produced by different processes. One method of producing zirconium metal is by the reduction of zirconium tetrachloride with magnesium. Zirconium carbide is chlorinated to produce zirconium tetrachloride. The tetrachloride is treated with magnesium in an electrically heated furnace, the temperature being high enough to cause reduction of the zirconium tetrachloride to a relatively pure zirconium metal sponge and magnesium chloride. The resultant zirconium metal in the form of a spongy mass is crushed to produce metal particles of suitable size for incorporating into the coating composition. The zirconium metal may be substantially pure metal or contain 1 to 5% hafnium to which it is usually associated.

Although an alloy of zirconium with aluminum and chromium hafnium is set out in an example illustrating the invention, it will be understood that other alloys of zirconium may be employed. Zirconium alloyed with up to 15% of other metals, e.g. molybdenum, tungsten, nickel, vanadium, copper or iron are illustrative of alloys which may also be used.

The term "zirconium metal" as used in the specification and claim is intended to include alloys of zirconium with other metals, particularly hafnium or mixtures of zirconium metal particles and wherein zirconium metal constitutes the major constituent of the metal or alloy.

While the compositions of the invention have been set out in a number of illustrative examples, it is to be understood that the invention is not specifically limited to these examples, and that equivalent materials may be used for those given. Further, the proportion of ingredients may be varied over a relatively wide range without departing from the spirit and scope of the invention as defined in the appended claim.

While the compositions described may be employed as a one coat finish, one or more applications of the coating may be made to provide a coating film on the surface of the thickness desired.

Having thus fully described my invention, what I claim as new and desire to protect by Letters Patent is:

A protective metal coating composition which is resistant to abrasion and atmospheric conditions conducive to corrosion, which is composed of finely divided zirconium metal particles dispersed in liquid sodium silicate, said zirconium metal particles being of a particle size such that approximately 80% passes a 200-mesh screen and the same is mixed with sodium silicate in the proportionate amounts in parts by weight of between about 60–120 parts zirconium metal and 20–40 parts sodium silicate, the resultant composition being adapted to be applied to a metal surface to form on baking at a temperature of 200–300° F. a continuous, hard, tenacious adherent protective coating film thereover.

References Cited in the file of this patent

UNITED STATES PATENTS

| | | |
|---|---|---|
| 2,155,592 | Hardy | Apr. 25, 1939 |
| 2,180,956 | Hensel | Nov. 21, 1939 |
| 2,294,756 | Inutsuka | Sept. 1, 1942 |
| 2,355,826 | George | Nov. 30, 1943 |
| 2,348,045 | Wooten | May 2, 1944 |
| 2,509,894 | Toulmin | May 30, 1950 |
| 2,690,982 | Gillmeister | Oct. 5, 1954 |